March 8, 1955 G. C. DI STEFANO 2,703,465
FISHING DEVICE
Filed Feb. 13, 1951
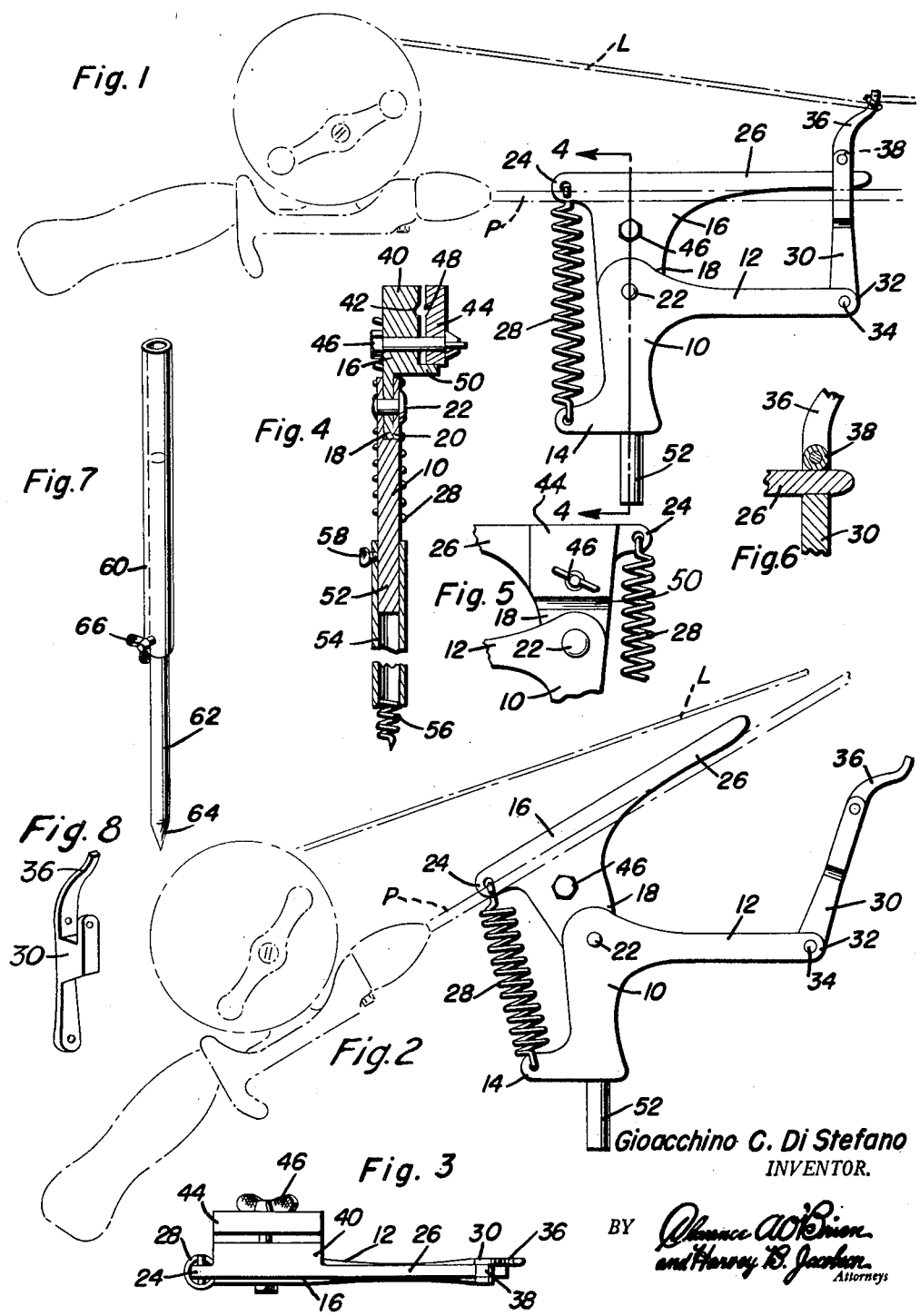
Gioacchino C. Di Stefano
INVENTOR.

United States Patent Office 2,703,465
Patented Mar. 8, 1955

2,703,465

FISHING DEVICE

Gioacchino C. Di Stefano, Kansas City, Mo.

Application February 13, 1951, Serial No. 210,644

2 Claims. (Cl. 43—15)

This invention relates to new and useful improvements in fishing devices and the primary object of the present invention is to provide a vertically swingable fishing pole holding member, a latch engaging the member and a spring acting on the member to raise the member as the latch is disengaged from the member whereby a jerk will be imparted to a pole held on the member so that a fish may be hooked on the hook carrying line of the pole.

Another important object of the present invention is to provide an automatic fishing device that is actuated by a fish engaging the line of a pole that is supported on the device to jerk the pole to hook the fish actuating the device.

A further object of the present invention is to provide a fishing device including a novel and improved holding member that is so constructed as to permit a pole to be quickly and readily applied thereto or removed therefrom in a convenient manner.

A still further aim of the present invention is to provide a fishing device that is simple and practical in construction, efficient and reliable in use, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention and showing a fishing pole, in dotted lines, applied thereto and with the latch engaged with the holding member;

Figure 2 is a view similar to Figure 1 but showing the latch disengaged from the holding member and the spring urging the holding member to its raised position;

Figure 3 is a top plan view of Figure 1;

Figure 4 is an enlarged vertical sectional view taken substantially on the plane of section line 4—4 of Figure 1 and showing the support anchoring means mounted on the support;

Figure 5 is an enlarged fragmentary side elevational view of the invention taken from the opposite side of Figure 1;

Figure 6 is an enlarged detail vertical sectional view showing the holding member engaged with the latch;

Figure 7 is a perspective view of one type of anchor member that is employed in conjunction with the present invention; and Figure 8 is a detail view of the bifurcated end of the latch.

Referring now to the drawings in detail, wherein for the purpose of illustration, there is disclosed a preferred embodiment of the present invention, the numeral 10 represents a support having a forwardly extending upper horizontal arm 12 and a rearwardly extending lower horizontal arm or ear 14.

A pole holding member 16 is mounted on the support 10 for vertical swinging movement and includes a lower end portion 18 that enters a vertical slot 20 in the support 10. A horizontal pivot 22 extends through the support 10, the walls of the slot 20 and the lower end portion 18 of the holding member.

The holding member 16 includes a rearwardly extending ear 24 and a forwardly extending horizontal arm 26. The apertures in the ears 14 and 24 receive the lower and upper hook ends of a vertically disposed coil spring 28 that yieldingly urges the member 16 and arm 26 to a raised position.

Means is provided for retaining the member 16 and arm 26 lowered against action of the spring 28. This means consists of a latch 30 whose lower end is pivoted to the bifurcated forward extremity 32 of the arm 12 by a horizontal pivot 34. The upper bifurcated end 36 of the latch 30 supports a roller 38 mounted on a pin positioned in the furcations of the bifurcated end 36 under which the forward end of the arm 26 is received when the device is cocked as shown in Figure 1. The roller 38 can be best seen in Figure 6.

The holding member 16 includes a block-like portion 40 having a horizontal groove 42 forming a pole seat. A clamping plate 44 is adjustably secured to the portion 40 by a fastener 46 and the plate 44 is formed with a groove 48 that registers with the groove 42 and which forms a pole seat. The portion 40 is formed with a horizontal flange 50 that slidably supports the plate 44.

A rod 52 depends from the support 10 and enters the upper end of a tube 54 whose lower end carries an anchoring spring 56 that may be embedded in the ground. The tube 54 supports a set screw 58 that is manually adjustable to bear against the rod 52 to adjust the tube longitudinally upon the rod 52.

Figure 7 shows the anchoring means modified to include a tube 60 in which there is slidably received a rod 62 having a pointed lower end 64. The rod 62 is longitudinally adjustable in the tube 60 by a set screw 66 carried by the tube. The upper end of the tube 60 receives the rod 52.

In practical use of the present invention, a fishing pole P is placed in the grooves 42 and 48 and the fastener 46 tightened. The arm 26 is then slipped under the roller 38 and the fishing line L is looped about the larger furcation of the bifurcated end 36 of the latch 30.

When a fish strikes at the hook on the line L, the latch 30 will be pulled forwardly and downwardly from the arm 26 to release the arm 26 whereupon the spring 28 will jerk the member 16 upwardly as well as the pole P to hook the fish. The loop in the line L about the bifurcated end 36 may then be released by manually pushing the loop off the larger furcation of the bifurcated end 36 and the fish reeled in.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing device comprising a support, a rod holding jaw member pivoted to said support for vertical swinging movement and including a forwardly extending arm and complementary gripping surfaces offset relative to the arm whereby a fishing rod supported by said jaw member and engaged with said surfaces will extend alongside said arm, spring means connecting the member to the support and yieldingly urging the arm to a raised position, and a line actuated latch element pivoted on said support and engaging the arm to hold the arm lowered against action of the spring means until the latch element is moved out of engagement from the arm by a forward pull on a line engaged with the latch element, a block having a horizontal groove therein, one of said complementary gripping surfaces being formed by said block having said horizontal groove therein forming a fishing rod seat, said block including a horizontal flanged portion beneath the groove, a clamping plate slidably mounted on said flanged portion and adjustably secured to said block, the other of said complementary gripping surfaces being formed by said clamping plate, said clamping plate having a groove in registry with the groove in said block, said latch element including a bifurcated upper end receiving said arm, and a roller mounted on said bifurcated end beneath which the arm is engaged when the arm is engaged with the latch element.

2. A fish rod holder comprising a support having a rearwardly extending lower arm and a forwardly extending upper arm, a rod holding clamp member pivoted to said support for vertical swinging movement and including a forwardly extending arm overlying the upper arm of said support and a rearwardly extending ear overlying the lower arm of said support, said clamp member including complementary gripping surfaces that are horizontally offset from said arms to hold a rod alongside of said upper arm, a coil spring terminally attached to said ear and said lower arm and urging the arm of said clamp member to a raised position, and a vertically swingable latch pivoted to said upper arm of said support and engaging the arm of said clamp member to hold the arm of said clamp member lowered against action of said spring, said latch adapted to engage a line to be pulled forwardly with the line to release the latch from said arm of said clamp member.

References Cited in the file of this patent

UNITED STATES PATENTS

| | | |
|---|---|---|
| 693,071 | Ruud | Feb. 11, 1902 |
| 1,467,834 | Bruch | Sept. 11, 1923 |
| 1,549,405 | Bjurstrom | Aug. 11, 1925 |
| 1,957,853 | Sibley | May 8, 1934 |
| 2,295,250 | Zenewich | Sept. 8, 1942 |
| 2,347,443 | Vesely | Apr. 25, 1944 |
| 2,438,388 | Dolk | Mar. 23, 1948 |
| 2,482,999 | Bean | Sept. 27, 1949 |

FOREIGN PATENTS

| | | |
|---|---|---|
| 906,202 | France | May 7, 1945 |